United States Patent [19]

De Acetis

[11] 4,303,677

[45] Dec. 1, 1981

[54] FROZEN PIZZA PROCESS

[75] Inventor: James De Acetis, Skokie, Ill.

[73] Assignee: The Quaker Oats Company, Chicago, Ill.

[21] Appl. No.: 76,629

[22] Filed: Sep. 18, 1979

[51] Int. Cl.³ .............................................. A21D 8/02
[52] U.S. Cl. ...................................... 426/27; 426/94; 426/283; 426/302; 426/502; 99/349
[58] Field of Search ............... 426/283, 279, 502, 512, 426/517, 391, 19, 27, 94, 302; 99/349

[56] References Cited

U.S. PATENT DOCUMENTS

| | | | |
|---|---|---|---|
| 3,190,758 | 6/1965 | Hauf | 426/391 |
| 3,203,368 | 8/1965 | Cooper et al. | 426/391 |
| 3,379,141 | 4/1968 | Groth | 426/502 |
| 3,716,319 | 2/1973 | Norman | 99/349 |
| 3,845,219 | 10/1974 | Federico | 426/19 |
| 3,879,564 | 4/1975 | Cocozzella | 426/283 |

*Primary Examiner*—Joseph M. Golian
*Assistant Examiner*—Elizabeth A. Hatcher
*Attorney, Agent, or Firm*—James T. FitzGibbon

[57] ABSTRACT

A prepared specialty frozen food product and method. The product is a frozen pizza with a filling-receiving crust portion made from a bread dough and a filling portion received within the crust. The method comprises preparing a bread dough product, subdividing the bread dough into individual dough elements, permitting the dough elements to rise, placing the dough elements within a forming pan having a flat, lower surface portion and an upwardly and outwardly tapering sidewall surface and pressing the dough elements within the pan so as to form the dough elements into flat sheets substantially co-extensive with the lower pan surface portion. Next, the dough sheets are allowed to rise, and are re-pressed so as to further exclude the dough radially. This causes the dough sheet to assume the contours of the pan bottom and sidewall and causes the crust to assume substantially uniform thickness in the bottom and sidewall areas of the pan. Then, the crust is at least partially baked, is removed from the pan and placed in a container other than the forming pan. Finally, the crust is filled and frozen.

4 Claims, 5 Drawing Figures

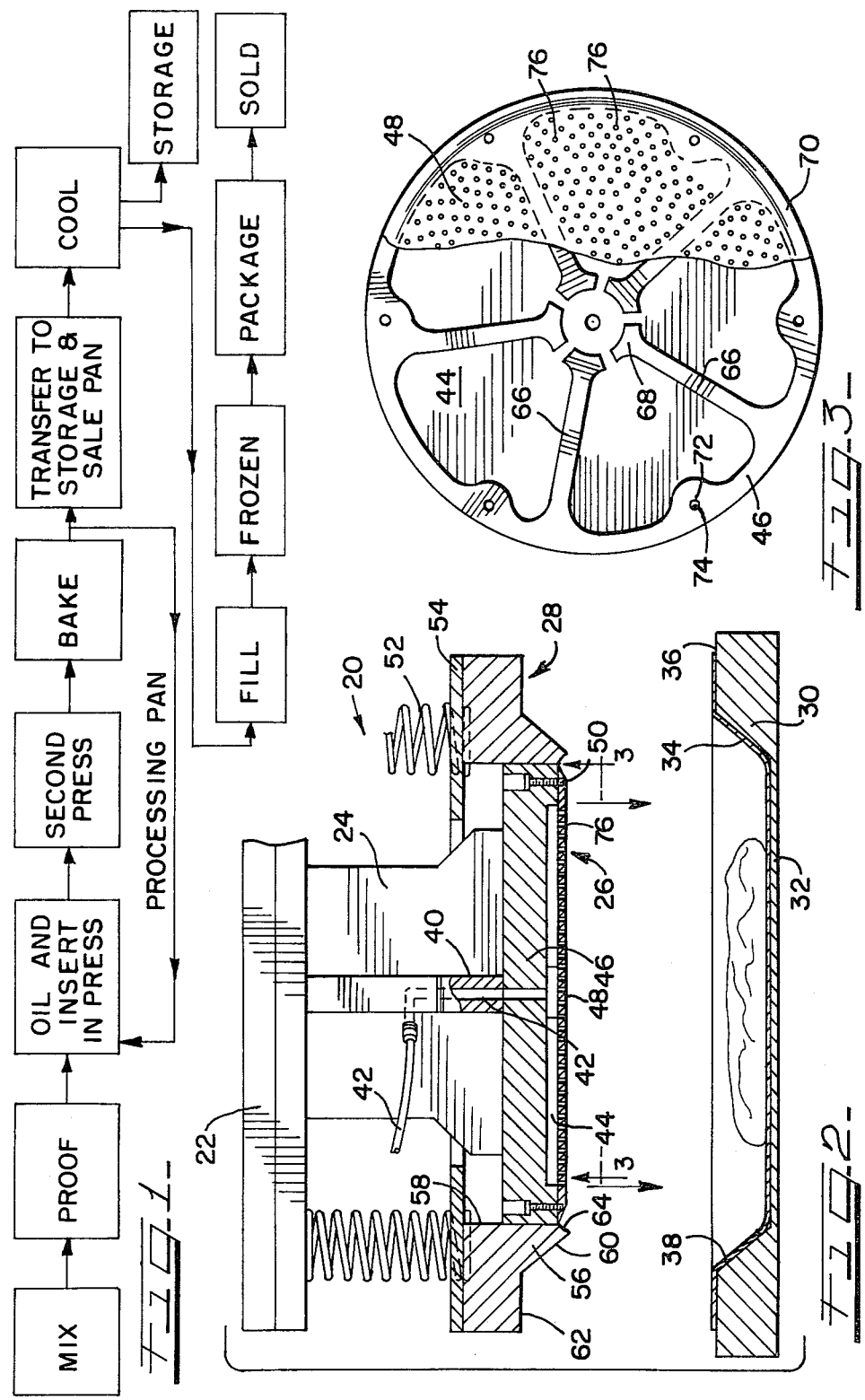

FROZEN PIZZA PROCESS

The present invention relates generally to prepared specialty food products and methods of making such products. More particularly, the invention relates to batch process methods of making a frozen, reheatable food product such as frozen pizzas in an economical manner enabling a high degree of quality control to be maintained at low cost.

Specialty frozen food products of the type which can be reheated and eaten in the home of the purchaser have become increasingly popular over the years beause they are nourishing, they offer a variety of contents, they appeal to varied tastes, and they offer ease and convenience of preparation. As various specialty food products such as frozen pizzas have been developed, their popularity has increased even further, so that at the present time, frozen pizzas and like products are very important commercially.

In the past, pizzas were tradtionally prepared by hand by relatively labor-intensive methods. Because these products were traditionally sold for immediate consumption, usually on the premises, their relatively high cost, reflecting their labor-intensive methods of manufacture, was not seriously disadvantageous. However, such methods, which involve not only significant skill and training on the part of the employee, but which also require other skills and experience, are not suitable for adaption to mass production techniques.

As the frozen pizza marketplace has expanded, there has been a corresponding expansion of price and quality competition, making it very important for a successful competitor to be able to manufacture high quality food products of this type at minimum cost and with as little labor expense as possible. Moreover, where prior art methods of filling pizzas has been random or dependent on the skill of an experienced operator, it is desirable in a manufacturing environment that the effect of random factors such as inexperienced labor and random selection of the composition of filling materials be minimized or eliminated.

It is also desired to manufacture products by methods which insure that careful quantity control can be maintained. In products of this sort, the amounts and types of filling, and uniformity of crust thickness, are important elements of overall quality control.

According to the invention, a method of manufacturing pizzas or like specialty frozen food products is provided wherein the batch method of manufacture can be used, wherein quality control is easy to obtain and maintain at desirable levels, and wherein a minimum amount of special manufacturing equipment is required.

In view of the shortcomings of certain prior art methods and practices, it is an object of the invention to provide an improved method of making a specialty food product.

It is another object of the invention to provide a method of making a multi-component food product having crust portion and filling portion, with such method including the steps of forming the crust portion into a unit of controlled size and cross-section by a simple, reliable and repeatable method.

A still further object is to provide an apparatus for manufacturing a frozen food product having uniform crust thickness.

Another object is to provide a method of making a food product with a bread type crust wherein advantage is taken of the characteristics of the bread dough during preparation to form the crust in a desired manner.

Yet another object is to provide an improved method of making deep dish style pizza products by the dough ball or batch method.

These and other objects and advantages of the invention are achieved in practice by providing a method which includes preparation of individual balls of dough, placing the balls in a processing pan supported by a lower die unit, performing a two stage pressing and reshaping operation to form a crust of uniform thickness and height, thereafter removing a portion of the dough support, baking the crust filling it with ingredients and freezing and packaging the product for ultimate sale to the consumer.

The exact manner in which these objects and advantages are achieved in practice will become more clearly apparent when reference is made to a detailed description of the preferred embodiments of the invention set forth by way of example, and shown in the accompanying drawings wherein like reference numbers indicate corresponding parts throughout.

BRIEF DESCRIPTION OF THE DRAWINGS

FIG. 1 is a block diagram showing the various steps in the method of the invention, including optional and/or alternate steps in such method;

FIG. 2 is a side view, partly in elevation and partly in section, and showing one press unit used to perform the method of the invention;

FIG. 3 is a bottom plan view, with portions broken away, taken along lines 3—3 of FIG. 2 and showing the structure of the press platen used to form the pizza crust made according to the method of the invention;

DESCRIPTION OF THE PREFERRED EMBODIMENTS OF THE INVENTION

Figure 4:
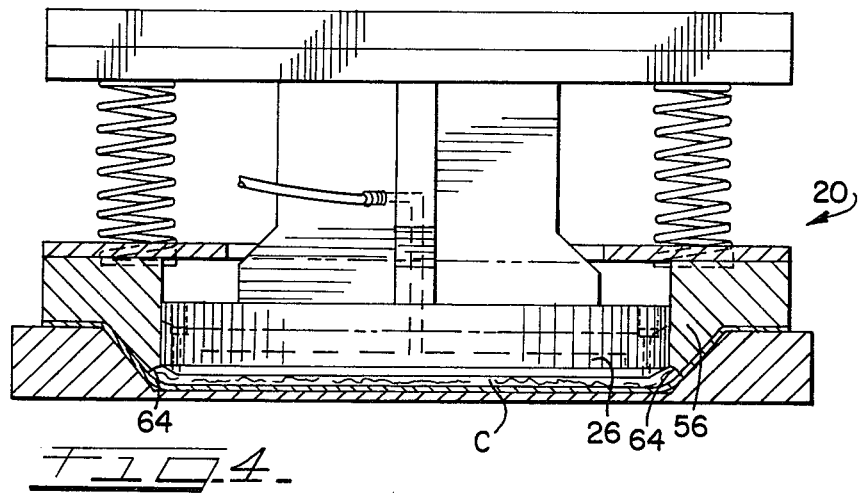
FIG. 4 is a sectional view of the press of FIG. 2, showing the platen in the fully lowered position, performing the first stage of crust formation.

While it will be understood that the principles of the invention are applicable to other food products, an illustration of the invention will be given with respect to an embodiment wherein the prepared product is a frozen pizza, made in the so-called deep dish or Chicago style.

Referring now to the drawings in greater detail, FIG. 1 is a block diagram showing the various steps typically performed in the process of the invention. The dough is mixed from known ingredients, as will appear, and is "proofed" or allowed to rise partially. It is then separated into a plurality of individual dough balls sized equally be weight in process machinery, with a light coating of oil then being sprayed over the exterior of each dough ball. Each dough ball is then pressed in a first stage press to be described, and is thereafter permitted to rise for a short time. Thereupon, the crust-forming dough is passed to a second pressing station where it is acted upon by a second press which serves to increase the radial extent of the crust somewhat and, in this step, the crust receives its exact final shape and is molded to an exact thickness and radial dimension.

The foregoing steps are carried out while the dough is received within a relatively thick (0.050 inches) aluminum pan referred to herein as a "processing pan". After the second press has imparted the desired shape to the pizza crust, the crust is baked and removed from its associated pan. After being removed from the pan, the crust is allowed to cool in an unsupported state and is then transferred to a second "sale" or "storage and sale" pan which is much thinner (0.004 inches). At this time, the processing pan is returned to the process line where it receives an additional dough ball and the cycle is repeated. Depending on processing circumstances, the cooled and completed crust may be placed in cold storage for subsequent filling, or may be filled immediately with a mix comprised of precooked and uncooked ingredients. Immediately thereafter, the entire pizza is frozen as a whole, usually with the aid of liquid nitrogen. It is then packaged and sent to distributors to be sold in the normal course of retail distribution.

Figure 5:
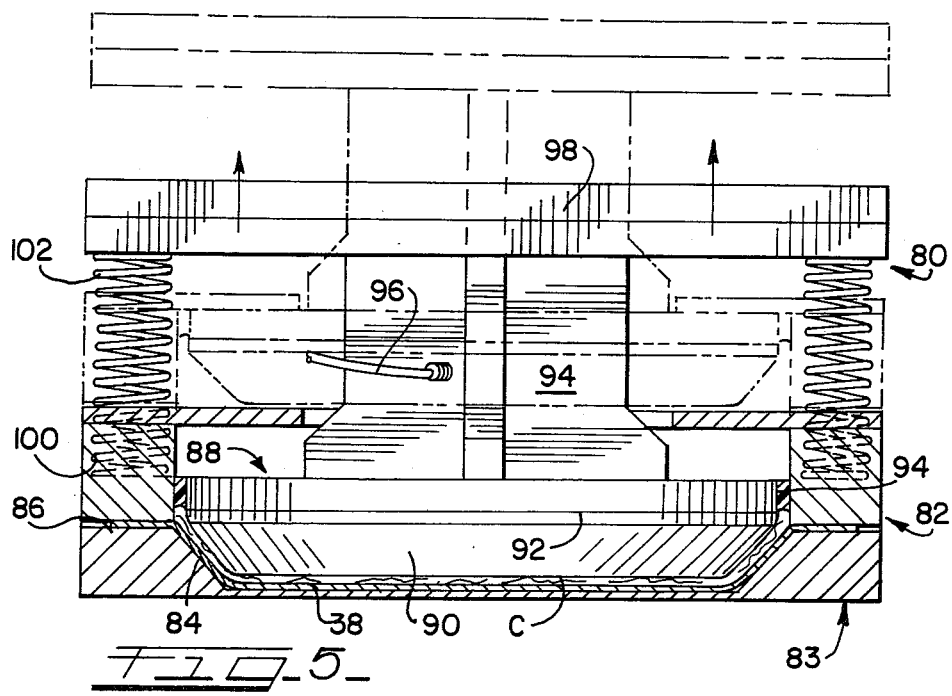
FIG. 5 is a side view, partly in section and partly in elevation, and showing a second press used to impart the final shape to a crust made according to the method of the invention.

The manner of forming the crust of the pizza of the invention is best illustrated in FIGS. 2, 4 and 5, with certain details of construction of a typical press platen assembly being shown in detail in FIG. 3.

Referring now to FIG. 2, there is shown a first stage press unit generally designated 20 which includes a top press plate 22, a reciprocable ram 24, a platen assembly 26, a stripper assembly 28 and a lower, pan-receiving die member 30. The lower die 30 is a solid unit having a recessed center section 32, tapering sidewalls 34 and an upper, circumferentially extending horizontal margin 36. In the preferred form of apparatus, a crust-containing processing pan 38 is received within the center section 32 of the die 30 when the process begins.

The ram 24 includes a plurality of vertically extending radial sidewalls 40, and an axially extending center opening 42 for the passage of air, received from a line 42, into a plenum or cavity 44 lying between the platen body 46 and the perforated lower plate 48 of the platen 26, which is secured to the body 46 by a plurality of fasteners 50.

The stripper assembly 28 is shown to be urged resiliently downwardly by a plurality of springs 52 engaging an annular flange 54 which surmounts the stripper ring 56. This ring 56 includes a cylindrical inner surface 58 separated by a working clearance from the platen body 46, a tapered sidewall surface 60 and a downwardly facing annular surface 62 adapted to engage an upper margin of the processing pan 38 when the stripper ring 56 and the platen assembly 26 are in a position of use. A contoured inner edge portion 64 is also provided at the lowermost portion of the stripper assembly 28, for reasons which will appear.

Referring now to FIG. 3, additional construction features of the platen are shown. As indicated, the platen body 46 includes a plurality of radially extending walls 66 terminating at inward webs 68, each of which has surfaces spaced just apart from their counterparts in adjacent walls 66. The walls 66 are integrally formed with the outer cylindrical side wall 70 of the platen body 46. The sidewall 70 includes a fastener-receiving boss 72 between each pair of walls 66, with each boss 72 having a fastener opening 74 therein. As shown in FIG. 3, a plurality of openings 76 are provided in the bottom plate 48, so that air pressure in the chamber 44 will help to release the dough when the platen 46 is moved upward and the stripper is temporarily held down.

The form of platen body 46 shown is preferred because it provides a relatively stiff but light weight assembly which is able to accomodate a large volume of air for an effective release action between the plate and the platen. In the preferred form, each of the holes 76 is about 0.020 inches in diameter.

Referring now to FIG. 4, the first stage press 20 is shown in the lowered position thereof, with the platen assembly 26 in an overlying and snugly engaged relation with the crust C. The contoured edges 64 of the first stage press stripper ring 56 prevent the crust C from moving radially past the position shown in FIG. 4.

While the operation of the apparatus will be referred to again herein, it will be understood by reference to FIGS. 2 and 4 that a typical pressing operation comprises lowering the stripper plate into a position overlying the edges of the pressing pan, and lowering the platen under hydraulic force to extrude the dough ball radially outwardly into sheet form. This establishes the initial dimension of the crust as further outward dough movement is prevented by the stripper plate edges 64.

Next, a charge of air is forced into the platen chamber 44, the platen is rapidly raised as the stripper ring 56 holds the pressing pan in place. After the platen has been raised to a withdrawn position, the stripper plate is raised against the action of the springs 52 in a conventional manner.

Referring now to FIG. 5, a second stage press generally designated 80 is shown. This press is similar to the first stage press insofar as it includes its own stripper ring 82, a lower die 83 having tapering sidewalls 84 and an upwardly facing annular radially outer margin 86. The platen assembly 88 includes an inwardly and downwardly directed, crust-forming lower surface 90, an upper, radially outwardly directed surface 92, and a stiff but lubricous polyethylene sealing ring 94 fixed to the surface 92.

The ram unit 94 resembles its counterpart in FIGS. 2 and 4, and also contains a similar interior construction, fittings 96 for receiving air, etc. A top press plate 98 reciprocates between the lowered position shown in solid lines and the raised position shown in phantom lines of FIG. 5 to operate the platen.

The stripper ring 82 includes spring-receiving pockets 100, springs 102 extending between the ring 82 and an outer margin of the top press plate 98. As shown, when the second stage press 80 is in the fully lowered position, the crust is disposed between the upper surface of the processing pan 38 and the downwardly and outwardly directed surfaces 90 of the platen assembly 88. Operation of this second stage press is similar to that of the first, with the cavity forming the crust being also defined in part by the seal ring 94 which is adapted to insure that the crust is exactly dimensioned as to thickness and radial dimension. In this manner, particularly when pizza crusts are formed in a circular shape, all of the dough which is produced in the process can be used without waste and without the need for recycling the dough through the process. Advantage can also be taken of the fact that the rising or "proofing" time of the crust element occurs at a predictable time, and that the consistency of the dough remains uniform. The exact control of the thickness and shape of the finished pizza product is very important for maintenance of quality image in mass production, and the construction of the presses as shown insures that exact dimensional control can be achieved in spite of density differences in the crust-forming dough during processing.

Referring now to the practice of the method of the invention, the crust is prepard for a typical pan style pizza formulation as follows.

| Ingredient | Parts by Weight |
| --- | --- |
| Flour | 400 |
| Gluten | 4 |
| Salt | 4 |
| Dextrose | 4 |
| Yeast | 8 |
| Soy oil | 12 |
| Water | 200 |
| Ca propionate | ½ |
| Na meta-bisulfite | 90 ppm |

The ingredients referred to above are mixed in a conventional manner, that is, the dextrose, salt and oil are mixed, and the contents thereof added to cake style yeast cake dissolved in warm water. Thereupon the flour, gluten, the additional water and the chemical additives are blended in during mixing. The product is mixed at a slow speed for approximately two to three minutes and at a high speed for four to eight minutes, with the mixed product attaining a temperature of 95° F.

In the above formulation, the ingredients are conventional and are known to those skilled in the art. The calcium propionate retards spoilage and the sodium metabisulfite serves to lower the elastic memory of the dough, i.e., to reduce the elasticity or tendency thereof to return to its original shape so that it can be more easily pressed into and remain in flat sheet form.

After the dough material is prepared as described above, it is separated into individual 10 ounce balls by machine. Each ball is "proofed" or permitted to rise for a period of about 12 to 15 minutes at a high relative humidity, at about 95° F. Thereafter a very light coat of vegetable oil is sprayed onto the dough ball which is then placed in the processing pan 38 supported by the lower die 30 of the first stage press 20. This press is then lowered, as described earlier, until it is in the position of FIG. 4, at which time the crust forming dough C has assumed uniform thickness and is spread out radially until its outer edge engages the contoured surface 64 of the stripper ring 56. This insures that the crust will be confined to an exact size and thickness. After the first pressing operation, 70 to 90 seconds proofing time is permitted to elapse, during which time the pan 38 is removed from the lower die 30 and placed in a second stage die 83 such as that shown at 83 in FIG. 5.

Next, the top plate 98, the ram 94 and the platen assembly 88 of the second stage press are lowered until the crust forming surfaces 90 are in the position shown in FIG. 5. This causes the radially outer edges of the crust C to move up the walls of the processing pan 84 where they are formed, with the aid of the sliding seal ring 94, into an exact cross sectional shape which is determined by the cooking requirements of the product. In this connection, it will be appreciated that it is important to form a crust edge with a predetermined cross section, so that the heat transfer into this portion of the crust during cooking will not be excessive and cause it to become blackened or burned.

When the pizza crust has been formed as illustrated in FIG. 5, air passes through line 97, pressurizing the plenum of the crust forming surface 90. The stripper ring 82 of the second stage press assembly remains down, holding the pan 38, and top press plate 98, the ram 94 and the platen assembly 88 are rapidly raised. This, in combination, with the air exiting from the pressing sheet, prevents the crust from sticking to the platen. In this connection it will be understood that the platen of FIG. 5 has an interior plenum and aperture construction which is the same or similar to that of its counterpart in FIG. 2.

After the platen and the stripper ring have been raised, a completed pre-formed crust remains in the processing pan. At this point, the crust may undergo a "docking" operation wherein steel rods or other small punching elements, typically of a diameter of 1/16" or less, and positioned on 1" centers on a press plate (not shown) are used to pierce the dough so that the dough will not "balloon" away from the cooking pan as its contents are heated and as gas escapes from the crust portion and travels beneath the lower surface of the crust.

Referring now to FIG. 1, it will be understood that after the second pressing operation, the pizza crust is baked, typically for five minutes in an oven of about 385° F. The crust is then removed from the pan, and the processing pan may be returned to the press operation.

The cooling time in an 85° to 90° F. baking room is about 4½ minutes during which time the crust temperature cools from just over 200° F. to 135° F. The pizza is not supported by any pan during the cooling stage. At this point, the pizza crust is placed in a lightweight sale pan, which is preferably aluminum foil of 0.004 to 0.005 inches in thickness and is used to support the just baked crust. This pan may alternatively be made of a so-called ovenable board or other suitable material. The crust may be filled with material of typical filling, such as cheese and tomato sauce, onion, sausage, mushroom or other typical pizza ingredients, or the crust may be placed in storage for performance of this step in a subsequent operation.

As soon as the pizza crust has been filled as just described, the completed product is then frozen and packaged for subsequent sale.

According to the invention, a pizza of carefully controlled quality and size may be manufactured while taking full advantage of the rising tendency of the dough after it is first made. The present invention in contrast to sheeting operations, wherein pieces are die-cut from sheet materials, such operations commonly being quite wasteful and involving a recycling of certain portions of the dough during manufacture.

It will thus be seen that the present invention provides a novel method of manufacturing pizza crust and pizza product, and that this product and method has a number of advantages and characteristics, including those pointed out herein and others which are inherent in the invention. A preferred embodiment of the invention having been described by way of example, it is anticipated that modifications and changes to the described process may be made without departing from the spirit of the invention or the scope of the appended claims.

I claim:

1. A method of making prepared specialty frozen food products which include filling-receiving crust portions made from a bread dough and filling portions received within said crusts, said method comprising preparing a bread dough product, subdividing said bread dough into individual dough elements, permitting said dough elements to rise, placing each of said dough elements with an associated forming pan having a flat, lower surface portion and an upwardly and outwardly tapering sideall surface, pressing said dough element within said pans so as to form said dough elements into flat sheets substantially co-extensive with said lower pan surface portions, permitting said dough sheets to rise, re-pressing said dough sheets so as to further extrude said dough radially and to cause said dough sheets to assume the contours of said pan bottom and sidewall surfaces, causing said crusts to assume substantially uniform thickness in said bottom and sidewall areas of said pans, at least partially baking said crusts, removing said crusts from said pan and placing said crusts in a container other than said forming pans, filling said baked crusts with a filling material, and freezing said completed products.

2. A method as defined in claim 1 which further includes the step of mechanically forming upstanding crust edges of uniform cross-section on said crusts, said edges extending upwardly from said sidewall portions of said crust.

3. A method as defined in claim 1 wherein said pressing includes the step of mechanically confining said dough sheets against radial expansion.

4. A method as defined in claim 1 wherein said re-pressing includes the step of mechanically confining said dough against radial expansion and simultaneously forming the edge portions of said dough sheets into upstanding edges of uniform thickness.

* * * * *

UNITED STATES PATENT AND TRADEMARK OFFICE
CERTIFICATE OF CORRECTION

PATENT NO. : 4,303,677
DATED : December 1, 1981
INVENTOR(S) : James DeAcetis

It is certified that error appears in the above—identified patent and that said Letters Patent is hereby corrected as shown below:

Column 1, line 44, after the word "quantity", insert
-- and quality --;

Signed and Sealed this

Sixth Day of April 1982

|SEAL|

*Attest:*

*Attesting Officer*

GERALD J. MOSSINGHOFF
*Commissioner of Patents and Trademarks*